Sept. 25, 1934.   D. H. BOGGS   1,974,598
APPARATUS FOR INSPECTING GLASS
Filed Dec. 22, 1932
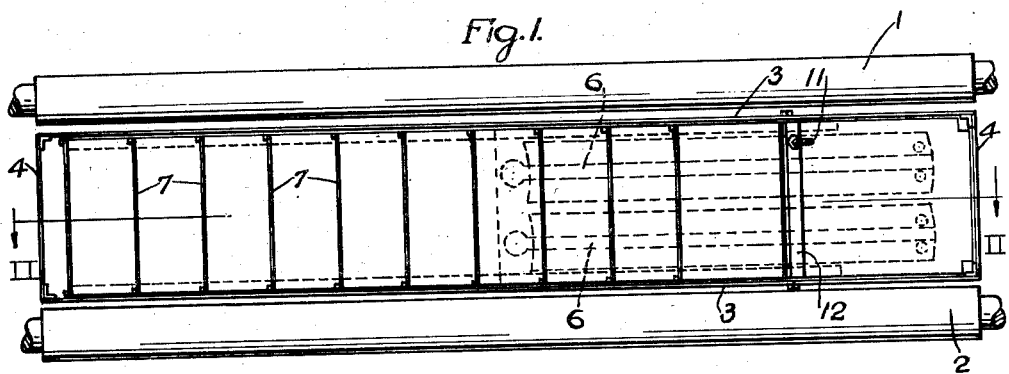
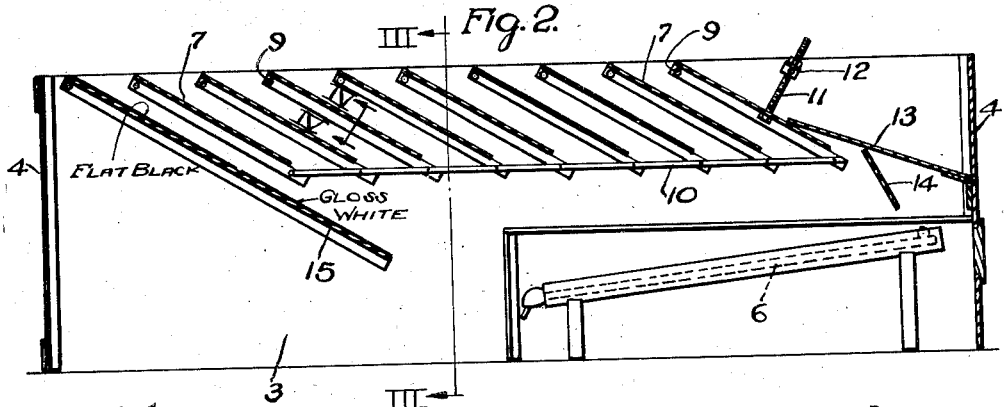
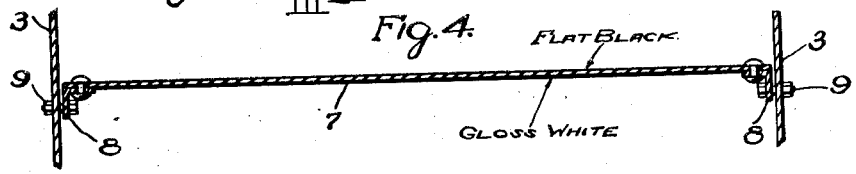
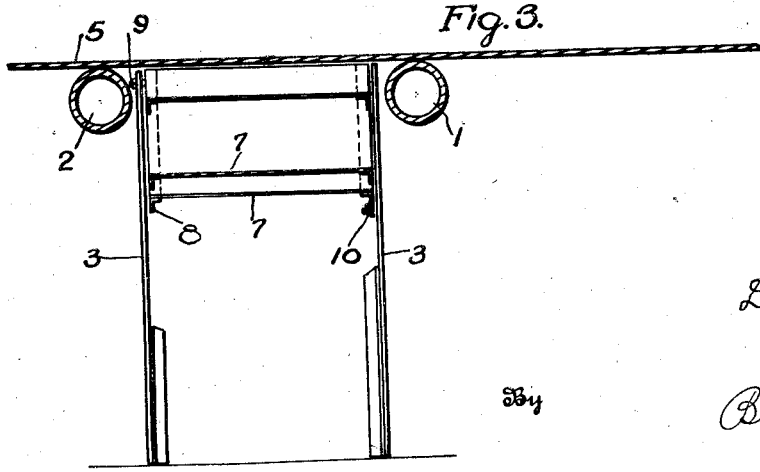
Inventor
David H. Boggs
by
Bradley & Bee
Attorney Patented Sept. 25, 1934

1,974,598

UNITED STATES PATENT OFFICE 1,974,598

APPARATUS FOR INSPECTING GLASS

David H. Boggs, Tarentum, Pa., assignor to Pittsburgh Plate Glass Company, a corporation of Pennsylvania Application December 22, 1932, Serial No. 648,468

7 Claims. (Cl. 88—14)

The invention relates to apparatus for inspecting flat glass. It is particularly designed for inspecting rough plate glass as it comes from a roller leer, and is so illustrated and described, but it will be understood that the invention is not limited to use in that connection, but is of broad application. The object of the invention is to provide improved means for illuminating the glass which will give uniform lighting of the glass in a manner most favorable for the detection of defects such as bubbles, stone, and the like, and which will give such illumination without any glare in the eyes of the observer which would tend to impair his efficiency and tire his eyes. Briefly stated, this is accomplished by directing the light through the glass at an acute angle and shielding the inspector on the side of the glass opposite to the source of illumination from all direct rays from such source. One embodiment of the invention is illustrated in the accompanying drawing wherein:

Figure 1 is a plan view of the apparatus. Fig. 2 is a vertical section on the line II—II of Fig. 1. Fig. 3 is an enlarged section on the line III—III of Fig. 2. And Fig. 4 is an enlarged section on the line IV—IV of Fig. 2.

Referring to the drawing, 1 and 2 are a pair of rolls constituting a part of a roller conveyor leading from a roller leer, such as is well known in the art. Lying between and below these rolls, is a sheet metal casing made up of the side plates 3, 3 and the end plates 4, 4, such casing being supported by suitable means which are not shown, and being of a length somewhat greater than the width of the glass sheet 5 which is to pass along the roller conveyor above the casing and be inspected.

Mounted in the bottom of the casing is a pair of mercury vapor lamps 6, 6, for which other suitable lighting means might be substituted, if desired. Located in the casing above the lamp is a shutter consisting of a series of parallel sheet metal plates 7, 7, 7, etc. lying at an acute angle to the plane of the glass sheet 5. The plates are stiffened at their edges by the angles 8 and are pivoted on hinge bolts 9, so that the angle of the plates may be adjusted to suit requirements. The plates are connected and maintained in parallelism by the tie bar 10. The screw rod 11 extending through the end member of the series of plates and through a bracket 12 carried by the casing serves as a means for adjusting the angle of the plates and fixing them in adjusted position.

The upper face of each of the shields or plates 7 is preferably painted a flat black color, while the lower sides are painted a glossy white. It will be understood, however, that the coloring of the plates may be modified depending on requirements as dictated by the character of the glass inspected and the kind of lighting means employed below the shutter. The space between the last plate 7 of the series and the end plate 4 of the casing, is closed by a plate 13 (Fig. 2), and a mirror 14 reflects light from the lamps onto the light vane 15, which is adjustable as to angle and has its lower portion painted a glossy white, so as to reflect the light against the white faces of the plates 7.

In using the apparatus, the inspector stands above the moving sheet of glass, and marks the defects therein as the sheet moves over the illuminated area above the shutter defined by the casing. The light from the lamps 6, 6 provides direct illumination for all parts of the glass lying above the shutter, but since this light passes through at an acute angle, the inspector who is directly above the shutter can not see the lamps which thus illumine the glass without shining into his eyes. The only reflected light passing upward is the small amount from the black upper faces of the shields, so that there is substantially no glare. The angular application of the light also seems to bring out any defects in the glass more clearly than light which is applied at right angles, so that a maximum illumination is secured and without glare or strain upon the eyes of the operator.

What I claim is:

1. In combination with a horizontal carrier comprising spaced rolls adapted to carry a sheet of glass thereover, inspection means comprising a shutter made up of a series of parallel shields extending transversely of the roles lying at an acute angle to the glass and located between a pair of said rolls below the level thereof, and lighting means below the shutter.

2. In combination with a horizontal carrier comprising spaced rolls adapted to carry a sheet of glass thereover, inspection means comprising a shutter made up of a series of parallel shields extending transversely of the rolls lying at an acute angle to the glass and located between a pair of said rolls below the level thereof, and lighting means below the shutter, said shields being adjustable as to angle.

3. In combination with a horizontal carrier comprising spaced rolls adapted to carry a sheet of glass thereover, inspection means comprising a shutter made up of a series of parallel shields extending transversely of the rolls lying at an acute angle to the glass and located between a pair of said rolls below the level thereof, and lighting means below the shutter, said shields being adjustable as to angle, and connected so as to maintain them in parallelism when adjusted.

4. In combination with a horizontal carrier comprising spaced rolls adapted to carry a sheet of glass thereover, inspection means comprising a shutter made up of a series of parallel shields extending transversely of the rolls lying at an acute angle to the glass and located between a pair of said rolls below the level thereof, and lighting means below the shutter, said shields having a dull finish on their upper surfaces.

5. In combination with a horizontal carrier comprising spaced rolls adapted to carry a sheet of glass thereover, inspection means comprising a shutter made up of a series of parallel shields extending transversely of the rolls lying at an acute angle to the glass and located between a pair of said rolls below the level thereof, lighting means below the shutter, and a casing enclosing the shutter and lighting means.

6. In combination with a horizontal carrier comprising spaced rolls adapted to carry a sheet of glass thereover, inspection means comprising a shutter made up of a series of parallel shields extending transversely of the rolls lying at an acute angle to the glass and located between a pair of said rolls below the level thereof, lighting means below the shutter, and a casing enclosing the shutter and lighting means, said shields having their upper surfaces provided with a dull flat finish and their lower surfaces with a light colored reflecting finish.

7. In combination with a horizontal conveyor comprising a series of parallel members spaced apart and adapted to carry a glass sheet, inspection means comprising a shutter made up of a series of parallel shields extending transversely of said parallel members lying at an acute angle to the glass sheet below the level thereof, and lighting means below the shutter.

DAVID H. BOGGS.